(12) United States Patent
Morokuma et al.

(10) Patent No.: US 9,195,253 B2
(45) Date of Patent: Nov. 24, 2015

(54) SIGNAL TRANSMISSION CIRCUIT

(75) Inventors: Kenichi Morokuma, Chiyoda-ku (JP); Jun Tomisawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/342,946

(22) PCT Filed: Apr. 18, 2012

(86) PCT No.: PCT/JP2012/060414
§ 371 (c)(1),
(2), (4) Date: Mar. 5, 2014

(87) PCT Pub. No.: WO2013/084517
PCT Pub. Date: Jun. 13, 2013

(65) Prior Publication Data
US 2014/0226366 A1     Aug. 14, 2014

(30) Foreign Application Priority Data

Dec. 5, 2011  (JP) ................................. 2011-265691

(51) Int. Cl.
*H03K 3/00* (2006.01)
*G05F 3/08* (2006.01)
*H04L 25/02* (2006.01)

(52) U.S. Cl.
CPC .............. *G05F 3/08* (2013.01); *H04L 25/0266* (2013.01)

(58) Field of Classification Search
USPC ......................................................... 327/108
See application file for complete search history.

(56) References Cited

U.S. PATENT DOCUMENTS

| 6,140,872 | A  | * | 10/2000 | McEldowney ..................... 330/9 |
| 2008/0303592 | A1 | * | 12/2008 | Deguchi et al. ............... 330/254 |
| 2009/0196312 | A1 | | 8/2009 | Kuroda |
| 2009/0322383 | A1 | | 12/2009 | Fukaishi et al. |

FOREIGN PATENT DOCUMENTS

| JP | 59 39110 | 3/1984 |
| JP | 7 213057 | 8/1995 |
| JP | 8 148947 | 6/1996 |
| JP | 2001 292043 | 10/2001 |

(Continued)

OTHER PUBLICATIONS

International Search Report Issued May 22, 2012 in PCT/JP12/060414 Filed Apr. 18, 2012.

(Continued)

*Primary Examiner* — Lincoln Donovan
*Assistant Examiner* — Patrick Chen
(74) *Attorney, Agent, or Firm* — Oblon, McClelland, Maier & Neustadt, L.L.P.

(57) ABSTRACT

A signal transmission circuit includes an isolation circuit, first and second grounded gate circuits, first and second MOS transistors, and a comparator. The isolation circuit such as a thin-film transformer outputs complementary first and second output signals, based on an input signal. The first and second grounded gate circuits receive and amplify the first and second output signals, respectively. The first and second MOS transistors are connected between a power supply node and the first and second grounded gate circuits, respectively, for adjusting the first and second output signals. The comparator compares output from the first grounded gate circuit with output from the second grounded gate circuit.

7 Claims, 10 Drawing Sheets

(56) References Cited

FOREIGN PATENT DOCUMENTS

| | | |
|---|---|---|
| JP | 2005-260889 | 9/2005 |
| JP | 2006 352838 | 12/2006 |
| JP | 2009 188468 | 8/2009 |
| JP | 2011 66515 | 3/2011 |
| WO | 2007 145086 | 12/2007 |

OTHER PUBLICATIONS

Decision to Grant Patent mailed May 19, 2015, in Japanese Patent Application No. 2013-548105 (with English-language translation).

* cited by examiner (A) CIRCUIT DIAGRAM    (B) OPERATION WAVEFORM (A) CIRCUIT DIAGRAM    (B) OPERATION WAVEFORM (A) CIRCUIT DIAGRAM    (B) OPERATION WAVEFORM (A) CIRCUIT DIAGRAM  (B) OPERATION WAVEFORM

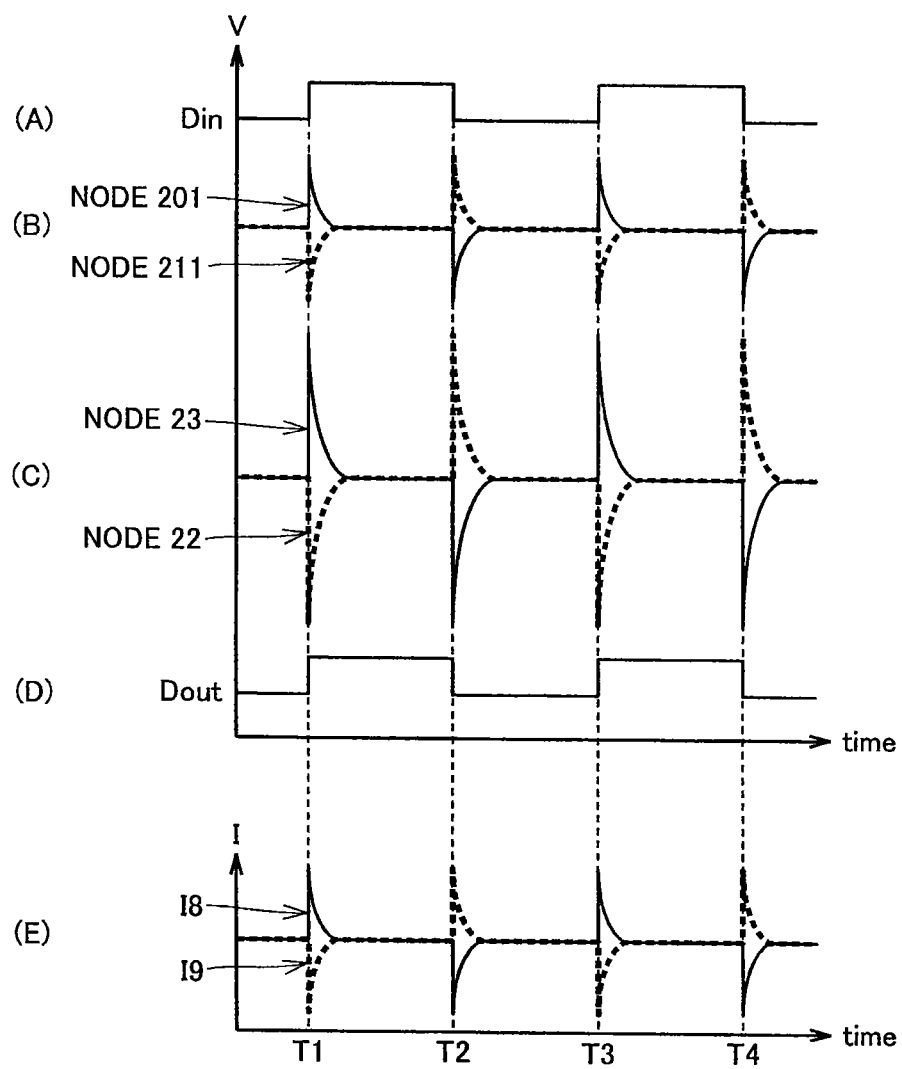

SIGNAL TRANSMISSION CIRCUIT

TECHNICAL FIELD

The present invention relates to a signal transmission circuit transmitting a signal through an isolation element.

BACKGROUND ART

For example, in a power device, in order to drive a three-phase AC motor or the like, an inverter converting a voltage from DC to AC is employed. In the inverter, a high voltage applied to an AC motor should electrically be isolated from a control unit, and a photocoupler has conventionally been employed as an isolation element.

As a transformer is reduced in size and thickness in recent years, however, a photocoupler is replaced with a pulse transformer superior in reliability, power consumption, integration, and transfer speed or an isolation element including a capacitance. A pulse transformer is required not only to achieve isolation but also to achieve lower cost based on reduction in circuit area.

In addition, for example, since a signal transmission circuit transmitting a signal through an isolation element is included in a three-phase AC motor or the like, incorrect output due to noise from the motor or the like should be suppressed.

Japanese Patent Laying-Open No. 7-213057 (PTD 1) discloses an isolation-type element for signal transmission. The isolation-type element for signal transmission disclosed in Japanese Patent Laying-Open No. 7-213057 (PTD 1) is constituted of a thin-film transformer, a first pulse conversion means, and a second pulse conversion means, the second pulse conversion means connected to a secondary winding has an input side connected to a cathode electrode of each of a first diode and a second diode having anode electrodes commonly connected to each other, and a resistor is connected in parallel to each of the first diode and the second diode. Then, an anode electrode common connection point of the first diode and the second diode is connected to respective source electrodes of a first MOS transistor and a second MOS transistor and a ground terminal GND.

In the isolation-type element for signal transmission disclosed in Japanese Patent Laying-Open No. 7-213057 (PTD 1), when a pulse signal which appears in the secondary winding of the thin-film transformer exhibits positive polarity (an opposite side of the secondary winding exhibits negative polarity), the first diode is biased in a reverse direction and the second diode is biased in a forward direction. Therefore, the second diode is set to an ON state, a voltage across a gate electrode of the first MOS transistor and ground terminal GND is set approximately to 0 V, the first MOS transistor is set to an OFF state, a pulse voltage of positive polarity of the secondary winding is applied substantially across the gate electrode of the second MOS transistor and ground terminal GND, the second MOS transistor is turned on, and a voltage at an output terminal OUT of the second pulse conversion means is set to 0 V.

On the other hand, when a pulse signal which appears in the secondary winding of the thin-film transformer exhibits negative polarity (an opposite side of the secondary winding exhibits positive polarity), the first diode is biased in the forward direction and the second diode is biased in the reverse direction. Therefore, the first diode is set to the ON state, the second diode is set to the OFF state, a voltage across the gate electrode of the second MOS transistor and ground terminal GND is set approximately to 0 V, the second MOS transistor is set to the OFF state, a pulse voltage of the secondary winding is applied substantially across a gate electrode of the first MOS transistor and ground terminal GND, the first MOS transistor is turned on, and a voltage at output terminal OUT of the second pulse conversion means is set to a high voltage.

As above, in the isolation-type element for signal transmission disclosed in Japanese Patent Laying-Open No. 7-213057 (PTD 1), since the secondary winding of the thin-film transformer can be formed from a single winding, decrease in the number of windings can be achieved and a smaller shape of a pulse transformer can be realized.

CITATION LIST

Patent Document

PTD 1: Japanese Patent Laying-Open No. 7-213057

SUMMARY OF INVENTION

Technical Problem

In the invention disclosed in Japanese Patent Laying-Open No. 7-213057 (PTD 1), however, the secondary winding of the thin-film transformer is formed from a single winding, and hence a resistor for applying DC bias to the secondary winding of the thin-film transformer is included.

This resistor for applying DC bias to the secondary winding of the thin-film transformer generates thermal noise, and generation of noise in a signal from the secondary winding of the thin-film transformer may cause incorrect output due to noise.

In addition, amplitude of a signal which appears in the secondary winding of the thin-film transformer attenuates due to resistance of the secondary winding. In order to suppress attenuation of signal amplitude, it is necessary either to increase resistance of the secondary winding of the thin-film transformer or to increase the number of windings of the thin-film transformer. When resistance of the secondary winding is increased, increase in circuit area and higher noise give rise to a problem, and increase in the number of windings of the thin-film transformer leads to increase in circuit area.

The present invention is made in view of the problems above, and an object thereof is to provide a signal transmission circuit achieving reduction in circuit area and suppressed incorrect output due to noise.

Solution to Problem

A signal transmission circuit according to the present invention is a signal transmission circuit transmitting a signal through an isolation element, and includes a pulse conversion means receiving an input signal and converting the input signal to a pulse signal, an isolation circuit including the isolation element, receiving output from the pulse conversion means, and outputting corresponding complementary first and second output signals, a first grounded-gate circuit amplifying the first output signal, a second grounded-gate circuit amplifying the second output signal, a first MOS transistor having a drain terminal connected to a node receiving the first output signal of the first grounded-gate circuit, for adjusting the first output signal, a second MOS transistor having a drain terminal connected to a node receiving the second output signal of the second grounded-gate circuit, for adjusting the second output signal, a constant current source having one end connected to a power supply node and the other end connected to a source terminal of the first MOS transistor and a source terminal of the second MOS transistor, and a comparator comparing output from the first grounded-gate circuit and output from the second grounded-gate circuit with each other.

Advantageous Effects of Invention

The signal transmission circuit according to the present invention applies a DC voltage to an output terminal of a thin-film transformer with the use of a grounded-gate circuit instead of a resistor, so that increase in circuit area attributed to the resistor or deterioration in resistance to noise is suppressed. In addition, by adjusting a voltage at a bias terminal connected to a gate terminal of each of the first MOS transistor and the second MOS transistor, a DC voltage at an output terminal of the thin-film transformer or gain of the grounded-gate circuit can be adjusted and incorrect output from the signal transmission circuit can be suppressed.

BRIEF DESCRIPTION OF DRAWINGS

FIG. 15 is a diagram showing change over time of each voltage resulting from an operation of signal transmission circuit 400 in a case that configuration example D shown in FIG. 5 is employed for pulse conversion means 6.

DESCRIPTION OF EMBODIMENTS

Figure 1:
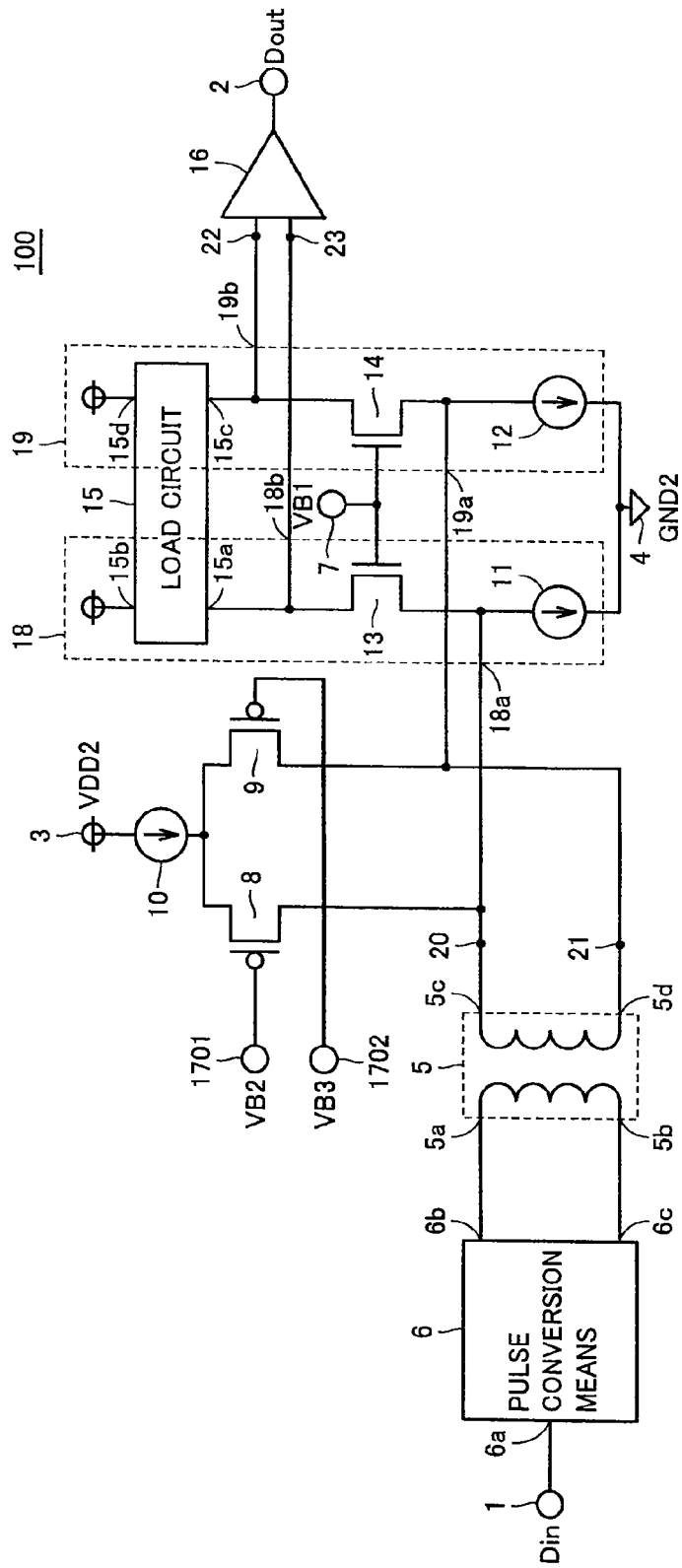
FIG. 1 is a circuit diagram showing a configuration of a signal transmission circuit according to a first embodiment of the present invention.

An embodiment of the present invention will be described hereinafter in detail. An embodiment according to the present invention will be described hereinafter with reference to the drawings. It is noted that, in each embodiment below, the same elements have the same reference characters allotted. In addition, a circuit below is by way of example and is not limited thereto.

First Embodiment

FIG. 1 is a circuit diagram showing a configuration of a signal transmission circuit according to a first embodiment of the present invention. Referring to FIG. 1, a signal transmission circuit 100 is a circuit receiving an input signal Din at an input terminal 1 and demodulating the input signal as an output signal Dout from an output terminal 2, while input terminal 1 and output terminal 2 are electrically isolated from each other by a thin-film transformer 5.

Signal transmission circuit 100 includes input terminal 1, output terminal 2, pulse conversion means 6, thin-film transformer 5, a PMOS transistor 8, a PMOS transistor 9, bias terminals 1701, 1702, a constant current source 10, grounded-gate circuits 18, 19, and a comparator 16.

Pulse conversion means 6 has an input terminal 6a connected to input terminal 1 and an output terminal 6b and an output terminal 6c individually connected to an input terminal 5a and an input terminal 5b of thin-film transformer 5, respectively.

Thin-film transformer 5 has input terminal 5a connected to output terminal 6b of pulse conversion means 6 and input terminal 5b connected to output terminal 6c of pulse conversion means 6. Thin-film transformer 5 has an output terminal 5c connected to an input terminal 18a of grounded-gate circuit 18 and an output terminal 5d connected to an input terminal 19a of grounded-gate circuit 19.

Gate ground circuit 18 includes a load circuit 15, an NMOS transistor 13, and a constant current source 11. Input terminal 18a is connected to output terminal 5c of thin-film transformer 5 and a drain terminal of PMOS transistor 8. An output terminal 18b is connected between load circuit 15 and a drain of N-channel MOS transistor 13 and connected to one input terminal of the comparator.

NMOS transistor 13 of grounded-gate circuit 18 has a gate terminal connected to a bias terminal 7, a source terminal connected to one end of constant current source 11, and a drain terminal connected to a terminal 15a of load circuit 15. In addition, a voltage VB1 is applied to bias terminal 7.

Constant current source 11 included in grounded-gate circuit 18 has one end connected to the source terminal of NMOS transistor 13 and output terminal 5c of thin-film transformer 5 and another one end connected to a reference potential 4.

Load circuit 15 has terminal 15a connected to the drain terminal of NMOS transistor 13, a terminal 15b connected to a voltage source 3, a terminal 15c connected to a drain terminal of an NMOS transistor 14, and a terminal 15d connected to voltage source 3.

Gate ground circuit 19 is the same in configuration as grounded-gate circuit 18 and different from grounded-gate circuit 18 in connection of input terminal 19a and an output terminal 19b. Gate ground circuit 19 has input terminal 19a connected to output terminal 5d of thin-film transformer 5 and a drain terminal of PMOS transistor 9 and output terminal 19b connected to another input terminal of the comparator.

NMOS transistor 14 of grounded-gate circuit 19 has a gate terminal connected to bias terminal 7, a source terminal connected to one end of a constant current source 12, and the drain terminal connected to terminal 15c of load circuit 15. In addition, voltage VB1 is applied to bias terminal 7.

Constant current source 12 of grounded-gate circuit 19 has one end connected to the source terminal of NMOS transistor 14 and output terminal 5d of thin-film transformer 5 and another one end connected to reference potential 4.

PMOS transistor 8 has a gate terminal connected to bias terminal 1701, a source terminal connected to one end of constant current source 10, and the drain terminal connected to output terminal 5c of thin-film transformer 5 and input terminal 18a of grounded-gate circuit 18.

PMOS transistor 9 has a gate terminal connected to bias terminal 1702, a source terminal connected to one end of constant current source 10, and the drain terminal connected to output terminal 5d of thin-film transformer 5 and input terminal 19a of grounded-gate circuit 19.

Constant current source 10 has one end connected to voltage source 3 and another one terminal connected to respective source terminals of PMOS transistor 8 and PMOS transistor 9.

Comparator 16 has one input terminal connected to output terminal 18b of grounded-gate circuit 18, another input terminal connected to output terminal 19b of grounded-gate circuit 19, and an output terminal connected to output terminal 2 of the signal transmission circuit.

Figure 2:
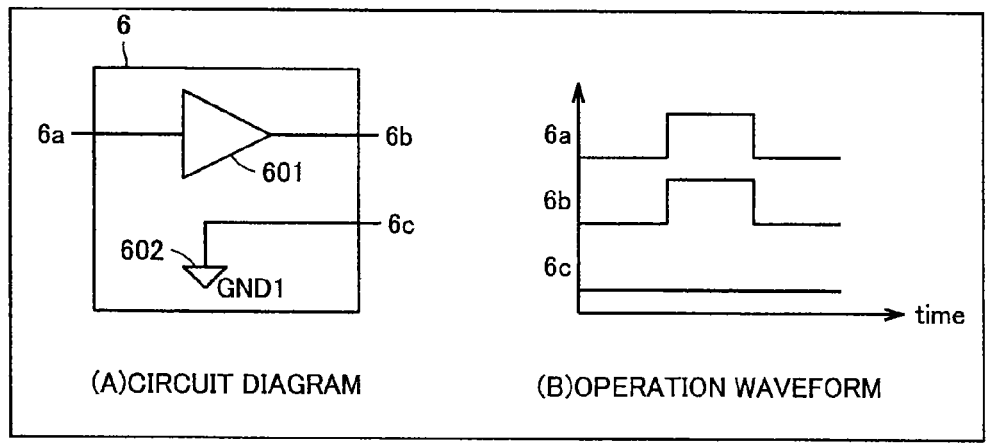
FIG. 2 is a circuit diagram (A) of a configuration example A showing a pulse conversion means in the first embodiment and a diagram showing an operation waveform (B) thereof.

FIG. 2 is a circuit diagram (A) of a configuration example A showing the pulse conversion means in the first embodiment and a diagram showing an operation waveform (B) thereof.

FIG. 2 (A) is a circuit diagram showing configuration example A of pulse conversion means 6 in the first embodiment, and FIG. 2 (B) shows an operation waveform thereof. As shown in FIG. 2 (A), pulse conversion means 6 includes a buffer circuit 601 and a reference potential 602.

Buffer circuit 601 has an input terminal connected to input terminal 6a of pulse conversion means 6 and an output terminal connected to output terminal 6b of pulse conversion means 6. Reference potential 602 is connected to output terminal 6c of pulse conversion means 6.

As shown in FIG. 2 (B), in an operation waveform in configuration example A of pulse conversion means 6, when a voltage at input terminal 6a of pulse conversion means 6 changes from low to high, a voltage at output terminal 6b also changes from low to high. Since output terminal 6c is connected to reference potential 602, it remains at a constant voltage with the reference potential being maintained. It is noted that configuration example A of pulse conversion means 6 is merely one circuit example and limitation thereto is not intended.

Figure 3:
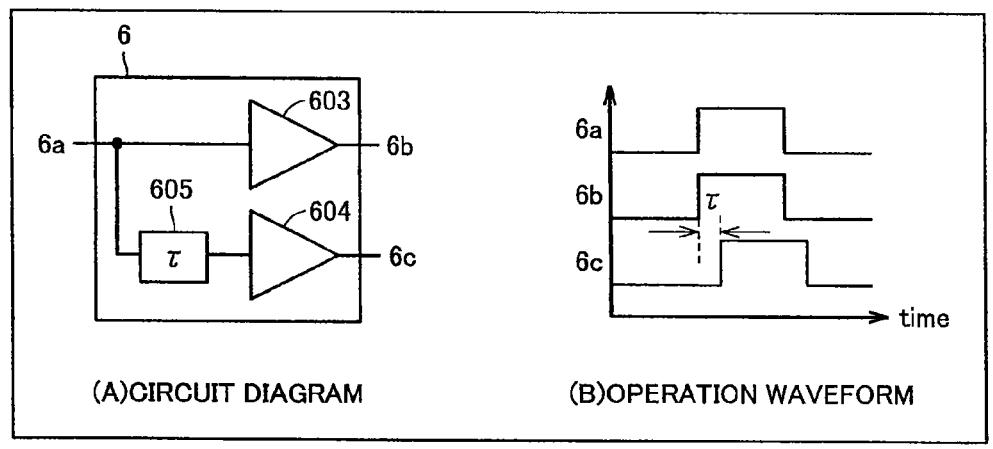
FIG. 3 is a circuit diagram (A) of a configuration example B showing the pulse conversion means in the first embodiment and a diagram showing an operation waveform (B) thereof.

FIG. 3 is a circuit diagram (A) of a configuration example B showing the pulse conversion means in the first embodiment and a diagram showing an operation waveform (B) thereof.

Referring to FIG. 3, FIG. 3(A) is a circuit diagram showing configuration example B of pulse conversion means 6 in the first embodiment, and FIG. 3 (B) shows an operation waveform thereof. As shown in FIG. 3(A), configuration example B of pulse conversion means 6 includes a buffer circuit 603, a buffer circuit 604, and a delay circuit 605.

Buffer circuit 603 has an input terminal connected to input terminal 6a of pulse conversion means 6 and an output terminal connected to output terminal 6b of pulse conversion means 6. Buffer circuit 604 has an input terminal connected to an output terminal of delay circuit 605 and an output terminal connected to output terminal 6c of pulse conversion means 6.

Delay circuit 605 has an input terminal connected to input terminal 6a of pulse conversion means 6 and the input terminal of buffer circuit 603 and the output terminal connected to the input terminal of buffer circuit 604. A time period of delay between an input signal and an output signal by delay circuit 605 is denoted as a delay time period $\tau$.

As shown in FIG. 3 (B), in an operation waveform of configuration example B of pulse conversion means 6, when a voltage at input terminal 6a of pulse conversion means 6 changes from low to high, a voltage at output terminal 6b also changes from low to high. A signal delayed by delay time period $\tau$ by delay circuit 605 is output to output terminal 6c. It is noted that configuration example B of pulse conversion means 6 is merely one circuit example and limitation thereto is not intended.

Figure 4:
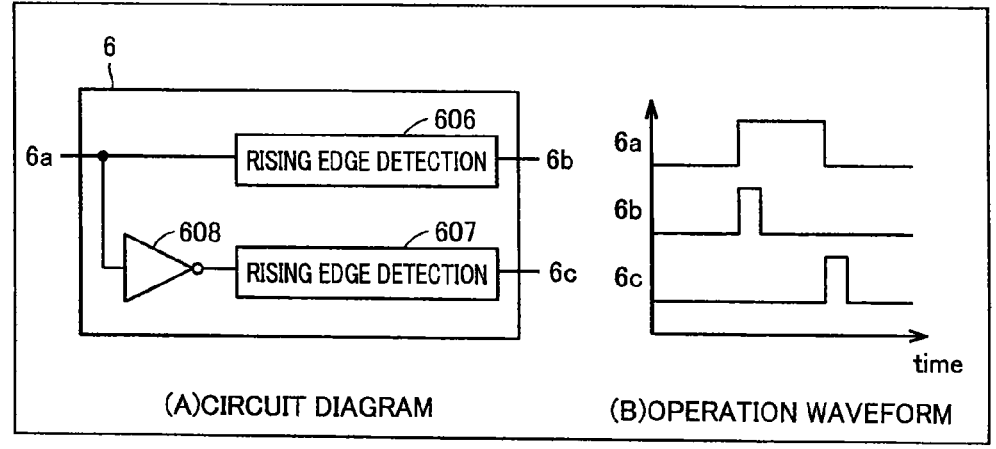
FIG. 4 is a circuit diagram (A) of a configuration example C showing the pulse conversion means in the first embodiment and a diagram showing an operation waveform (B) thereof.

FIG. 4 is a circuit diagram (A) of a configuration example C showing the pulse conversion means in the first embodiment and a diagram showing an operation waveform (B) thereof. Referring to FIG. 4, FIG. 4 (A) is a circuit diagram showing configuration example C of pulse conversion means 6 in the first embodiment, and FIG. 4 (B) shows an operation waveform thereof. As shown in FIG. 4 (A), configuration example C of pulse conversion means 6 includes a rising edge detection circuit 606, a rising edge detection circuit 607, and an inverter 608.

Rising edge detection circuit 606 has an input terminal connected to input terminal 6a of pulse conversion means 6 and an output terminal connected to output terminal 6b of pulse conversion means 6. Rising edge detection circuit 607 has an input terminal connected to an output terminal of inverter 608 and an output terminal connected to output terminal 6c of pulse conversion means 6.

Inverter 608 has an input terminal connected to input terminal 6a of pulse conversion means 6 and the output terminal connected to the input terminal of rising edge detection circuit 607.

As shown in FIG. 4 (B), in an operation waveform of configuration example C of pulse conversion means 6, when a voltage at input terminal 6a of pulse conversion means 6 changes from low to high, rising edge detection circuit 606 detects a rising edge and outputs a pulse waveform to output terminal 6b.

On the other hand, rising edge detection circuit 607 detects a rising edge of a signal resulting from inversion of a voltage at input terminal 6a by inverter 608, and outputs a pulse waveform to output terminal 6c. It is noted that configuration example C of pulse conversion means 6 is merely one circuit example and limitation thereto is not intended.

Figure 5:
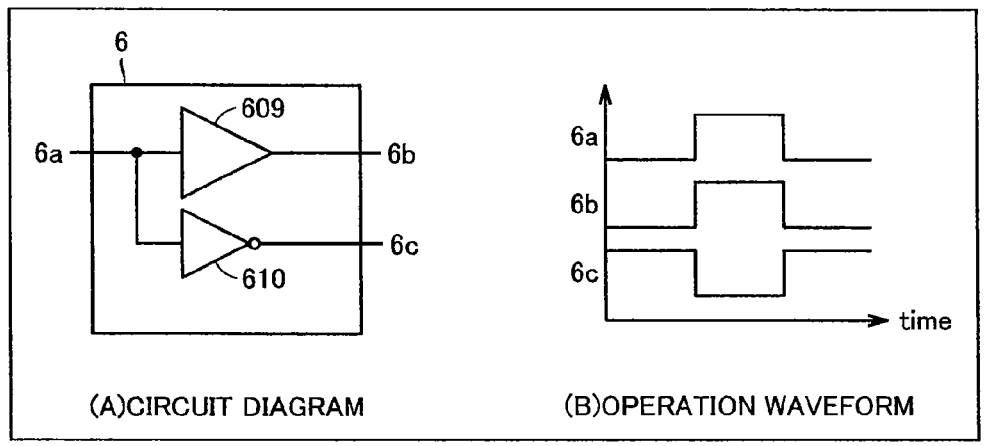
FIG. 5 is a circuit diagram (A) of a configuration example D showing the pulse conversion means in the first embodiment and a diagram showing an operation waveform (B) thereof.

FIG. 5 is a circuit diagram (A) of a configuration example D showing the pulse conversion means in the first embodiment and a diagram showing an operation waveform (B) thereof. Referring to FIG. 5, FIG. 5 (A) is a circuit diagram showing a configuration example D of pulse conversion means 6 in the first embodiment, and FIG. 5 (B) shows an operation waveform thereof. As shown in FIG. 5 (A), configuration example D of pulse conversion means 6 includes a buffer circuit 609 and an inverter 610.

Buffer circuit 609 has an input terminal connected to input terminal 6a of pulse conversion means 6 and an output terminal connected to output terminal 6b of pulse conversion means 6.

Inverter 610 has an input terminal connected to input terminal 6a of pulse conversion means 6 and an output terminal connected to output terminal 6c of pulse conversion means 6.

As shown in FIG. 5 (B), in an operation waveform of configuration example D of pulse conversion means 6, when a voltage at input terminal 6a of pulse conversion means 6 changes from low to high, a voltage at output terminal 6b also changes from low to high. A voltage resulting from inversion of a voltage at input terminal 6a by inverter 610 is output to output terminal 6c. It is noted that configuration example D of pulse conversion means 6 is merely one circuit example and limitation thereto is not intended.

Figure 6:
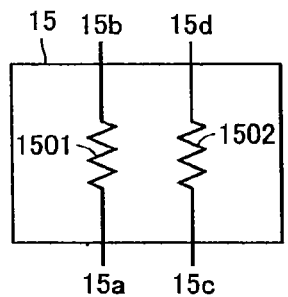
FIG. 6 is a circuit diagram showing a configuration example A of a load circuit 15 in the first embodiment.

FIG. 6 is a circuit diagram showing a configuration example A of load circuit 15 in the first embodiment. Referring to FIG. 6, configuration example A of load circuit 15 includes a resistor 1501 and a resistor 1502.

Ends of resistor 1501 are connected between terminal 15a and terminal 15b of load circuit 15, and ends of resistor 1502 are connected to terminal 15c and terminal 15d respectively. It is noted that configuration example A of load circuit 15 is merely one circuit example and limitation thereto is not intended.

Figure 7:
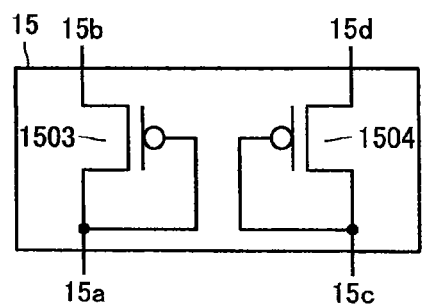
FIG. 7 is a circuit diagram showing a configuration example B of load circuit 15 in the first embodiment.

FIG. 7 is a circuit diagram showing a configuration example B of load circuit 15 in the first embodiment. Referring to FIG. 7, configuration example B of load circuit 15 includes a PMOS transistor 1503 and a PMOS transistor 1504.

PMOS transistor 1503 has a gate terminal connected to a drain terminal of MOS transistor 1503 and terminal 15a of load circuit 15, the drain terminal connected to terminal 15a of load circuit 15, and a source terminal connected to terminal 15b of load circuit 15.

PMOS transistor 1504 has a gate terminal connected to a drain terminal of MOS transistor 1504 and terminal 15c of load circuit 15, the drain terminal connected to terminal 15c of load circuit 15, and a source terminal connected to terminal 15d of load circuit 15.

Instead of PMOS transistors 1503, 1504, a diode may be arranged. It is noted that configuration example B of load circuit 15 is merely one circuit example and limitation thereto is not intended.

Figure 8:
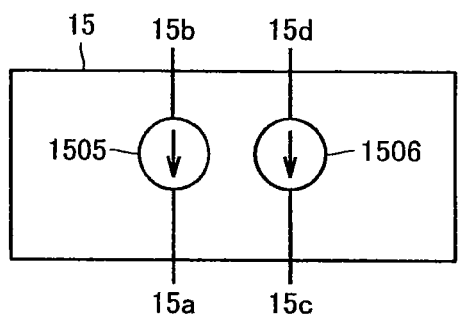
FIG. 8 is a circuit diagram showing a configuration example C of load circuit 15 in the first embodiment.

FIG. 8 is a circuit diagram showing a configuration example C of load circuit 15 in the first embodiment. Referring to FIG. 8, configuration example C of load circuit 15 includes a constant current source 1505 and a constant current source 1506.

Constant current source 1505 is connected between terminal 15a and terminal 15b of load circuit 15. Constant current source 1506 is connected between terminal 15c and terminal 15d of load circuit 15. It is noted that configuration example C of load circuit 15 is merely one circuit example and limitation thereto is not intended.

Figure 9:
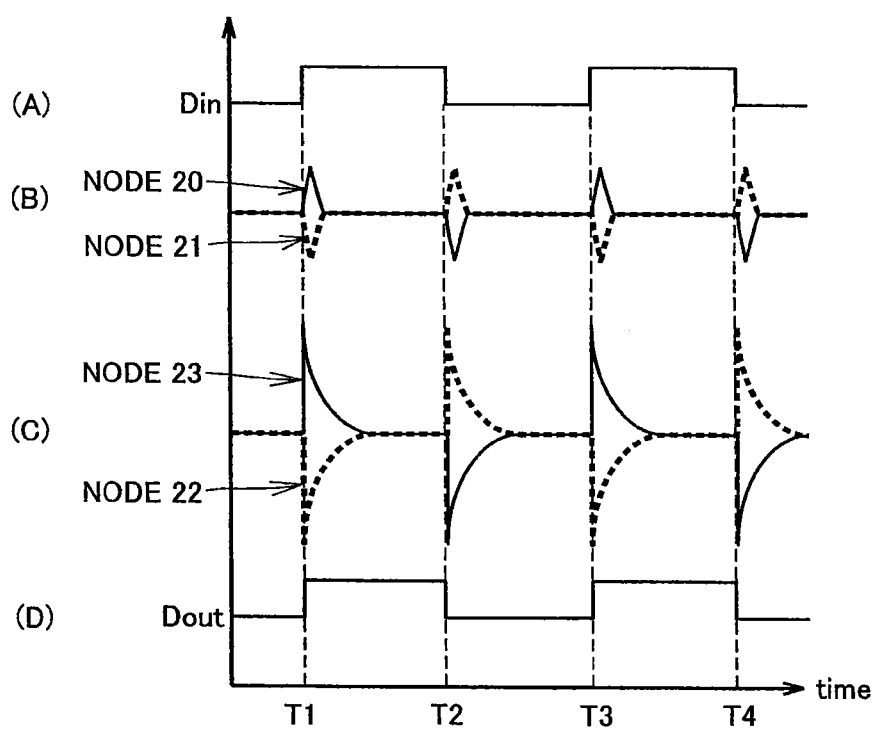
FIG. 9 is a diagram showing change over time of each voltage resulting from an operation of a signal transmission circuit 100 in a case that configuration example A shown in FIG. 2 is employed for pulse conversion means 6.

FIG. 9 is a diagram showing change over time of each voltage resulting from an operation of signal transmission circuit 100 in a case that configuration example A shown in FIG. 2 is employed for pulse conversion means 6. An operation of signal transmission circuit 100 will be described with reference to FIG. 9.

FIG. 9 (A) shows a waveform of input signal Din which is a digital signal. FIG. 9 (B) shows voltage waveforms at a node 20 and a node 21. FIG. 9 (C) shows voltage waveforms at a node 22 and a node 23. FIG. 9 (D) shows a waveform of output signal Dout.

As shown in FIG. 9 (A), at time T1, the logic level of this input signal Din rises from low to high, and at time T2, it falls from high to low. Then, again, the same signal change is repeated every (time T3−time T1) cycle.

When input signal Din rises from low to high (at time T1), as shown in FIG. 9 (B), slight signal change occurs at node 20 connected to output terminal 5c of thin-film transformer 5.

Here, at node 21 connected to output terminal 5d of thin-film transformer 5, a differential signal resulting from reversal of polarity of the signal generated at node 20 is generated. Namely, during a time period T1–T2, output signals which flow through nodes 20, 21 are signals complementary to each other.

In addition, when input signal Din falls from high to low (at time T2), at node 20 connected to output terminal 5c of thin-film transformer 5, a signal reverse in phase to weak signal change at node 20 which occurred at the time of previous rise of input signal Din from low to high is generated. Namely, when time period T1–T2 and a time period T2–T3 are compared with each other, an output signal which flows through node 20 is reverse in phase.

At node 21 connected to output terminal 5d of thin-film transformer 5, as in the previous case, a differential signal resulting from reversal of polarity of the signal generated at node 20 is generated. Namely, during time period T2–T3, output signals which flow through nodes 20, 21 are signals complementary to each other.

A signal generated at output terminal 5c (node 20) of thin-film transformer 5 is input to input terminal 18a of grounded-gate circuit 18, and the amplified signal is output from output terminal 18b thereof.

A signal generated at output terminal 5d (node 21) of thin-film transformer 5 is input to input terminal 19a of grounded-gate circuit 19, and the amplified signal is output from output terminal 19b thereof.

As shown in FIG. 9 (C), the signal at output terminal 18b of grounded-gate circuit 18 and the signal at output terminal 19b of grounded-gate circuit 19 which are differentially amplified are input to respective input terminals of comparator 16 at time T1 and they determine the logic level as output from comparator 16.

As shown in FIG. 9 (D), the output signal from comparator 16 is output signal Dout of output terminal 2 of signal transmission circuit 100 at time T1, and it is output by demodulating input signal Din which is a digital signal.

A DC voltage of a signal at output terminal 5c (node 20) of thin-film transformer 5 is uniquely determined by a cascode circuit constituted of constant current source 11 and NMOS transistor 13 of grounded-gate circuit 18.

A DC voltage of a signal at output terminal 5d (node 21) of thin-film transformer 5 is uniquely determined by a cascode circuit constituted of constant current source 12 and NMOS transistor 14 of grounded-gate circuit 19.

The DC voltages at respective output terminals 5c (node 20) and 5d of thin-film transformer 5 are different in potential due to variation in process. This potential difference causes a potential difference between differential signals to be amplified by grounded-gate circuit 18 and grounded-gate circuit 19, and incorrect output from signal transmission circuit 100 may be likely.

In the present first embodiment, however, bias terminal 1701 and bias terminal 1702 are used to adjust a potential difference between voltages VB2 and VB3 at the respective gate terminals of PMOS transistor 8 and PMOS transistor 9, so that DC voltages at respective output terminal 5c (node 20) and output terminal 5d (node 21) of thin-film transformer 5 can be adjusted and a potential difference between node 20 and node 21 caused by variation in process can be lessened. Thus, incorrect output of signal transmission circuit 100 can be suppressed.

In a case that there is no variation in process and DC voltages at output terminal 5c (node 20) and output terminal 5d (node 21) of thin-film transformer 5 are equal to each other, when voltage VB3 at bias terminal 1702 is higher than voltage VB2 at bias terminal 1701, a voltage at 5d (node 21) is lower than a voltage at output terminal 5c (node 20) of thin-film transformer 5. When voltage VB3 at bias terminal 1702 is lower than voltage VB2 at bias terminal 1701, a voltage at 5d (node 21) is higher than a voltage at output terminal 5c (node 20) of thin-film transformer 5.

By thus adjusting a potential difference between voltage VB2 and voltage VB3 at the respective gate terminals of PMOS transistor 8 and PMOS transistor 9, variation in process can be lessened.

Therefore, when a potential difference between DC voltages at node 20 and node 21 is caused by variation in process, the potential difference between node 20 and node 21 can be lessened by adjusting the potential difference between voltage VB2 at bias terminal 1701 and voltage VB3 at bias terminal 1702.

In addition, by using bias terminal 1701 and bias terminal 1702 to adjust voltage VB2 and voltage VB3 at the respective gate terminals of PMOS transistor 8 and PMOS transistor 9 without change in potential difference between voltage VB2 and voltage VB3 thereof, gain of grounded-gate circuit 18 and grounded-gate circuit 19 and output DC voltages at respective output terminal 18b and output terminal 19b can be adjusted.

When voltage VB2 and voltage VB3 at respective bias terminal 1701 and bias terminal 1702 are lowered without change in potential difference therebetween, gain of grounded-gate circuit 18 and grounded-gate circuit 19 increases and output DC voltages at respective output terminal 18b and output terminal 19b become higher.

When voltage VB2 and voltage VB3 at respective bias terminal 1701 and bias terminal 1702 are raised without change in potential difference therebetween, gain of grounded-gate circuit 18 and grounded-gate circuit 19 decreases and output DC voltages at respective output terminal 18b and output terminal 19b become lower.

By thus adjusting voltage VB2 and voltage VB3 at respective bias terminal 1701 and bias terminal 1702 without change in potential difference therebetween, signal amplitude and output DC voltages at output terminal 18b and output terminal 19b of respective grounded-gate circuit 18 and grounded-gate circuit 19 can be adjusted.

Consequently, saturation of signal amplitude of output terminal 18b and output terminal 19b of respective grounded-gate circuit 18 and grounded-gate circuit 19 can be suppressed. In addition, incorrect output of signal transmission circuit 100 can be suppressed through adjustment to an optimal input DC voltage to connected comparator 16.

Thus, in signal transmission circuit 100 in the first embodiment, DC voltages at respective output terminals 5c (node 20) and 5d (node 21) of thin-film transformer 5 are provided from the cascode circuit constituted of the constant current sources and the NMOS transistors included in grounded-gate circuit 18 and grounded-gate circuit 19, so that lowering in signal amplitude due to resistance or lowering in resistance to noise due to thermal noise of the resistor can be suppressed as compared with the case that the resistor in Japanese Patent Laying-Open No. 7-213057 (PTD 1) is employed.

In addition, in signal transmission circuit 100 in the first embodiment, lowering in signal amplitude due to resistance is suppressed without increase in amount of current of pulse conversion means 6. In signal transmission circuit 100 in the first embodiment, lowering in signal amplitude due to resistance is suppressed without increase in the number of windings in thin-film transformer 5.

Namely, in signal transmission circuit 100 in the first embodiment, a DC voltage can be applied to each output terminal of thin-film transformer 5 without increase in current consumption and without increase in circuit area due to increase in the number of windings in thin-film transformer 5.

Furthermore, in signal transmission circuit 100, bias terminal 1701 and bias terminal 1702 are used to adjust a potential difference between the gate terminal of PMOS transistor 8 and the gate terminal of PMOS transistor 9, so that DC voltages at respective output terminal 5c (node 20) and output terminal 5d (node 21) of thin-film transformer 5 can be adjusted.

By decreasing potential difference between output terminal 5c (node 20) and output terminal 5d (node 21) of thin-film transformer 5 caused by variation in process, incorrect output of signal transmission circuit 100 due to the potential difference can be suppressed.

In signal transmission circuit 100, bias terminal 1701 and bias terminal 1702 are used to raise or lower voltage VB2 at the gate terminal of PMOS transistor 8 and voltage VB3 at the gate terminal of PMOS transistor 9 without change in potential difference therebetween, so that gain of grounded-gate circuit 18 and grounded-gate circuit 19 and an output DC voltage can be adjusted, saturation of signal amplitude of output terminal 18b and output terminal 19b of respective grounded-gate circuit 18 and grounded-gate circuit 19 is suppressed, and incorrect output of signal transmission circuit 100 can be suppressed through adjustment to an optimal input DC voltage to connected comparator 16.

Second Embodiment

Figure 10:
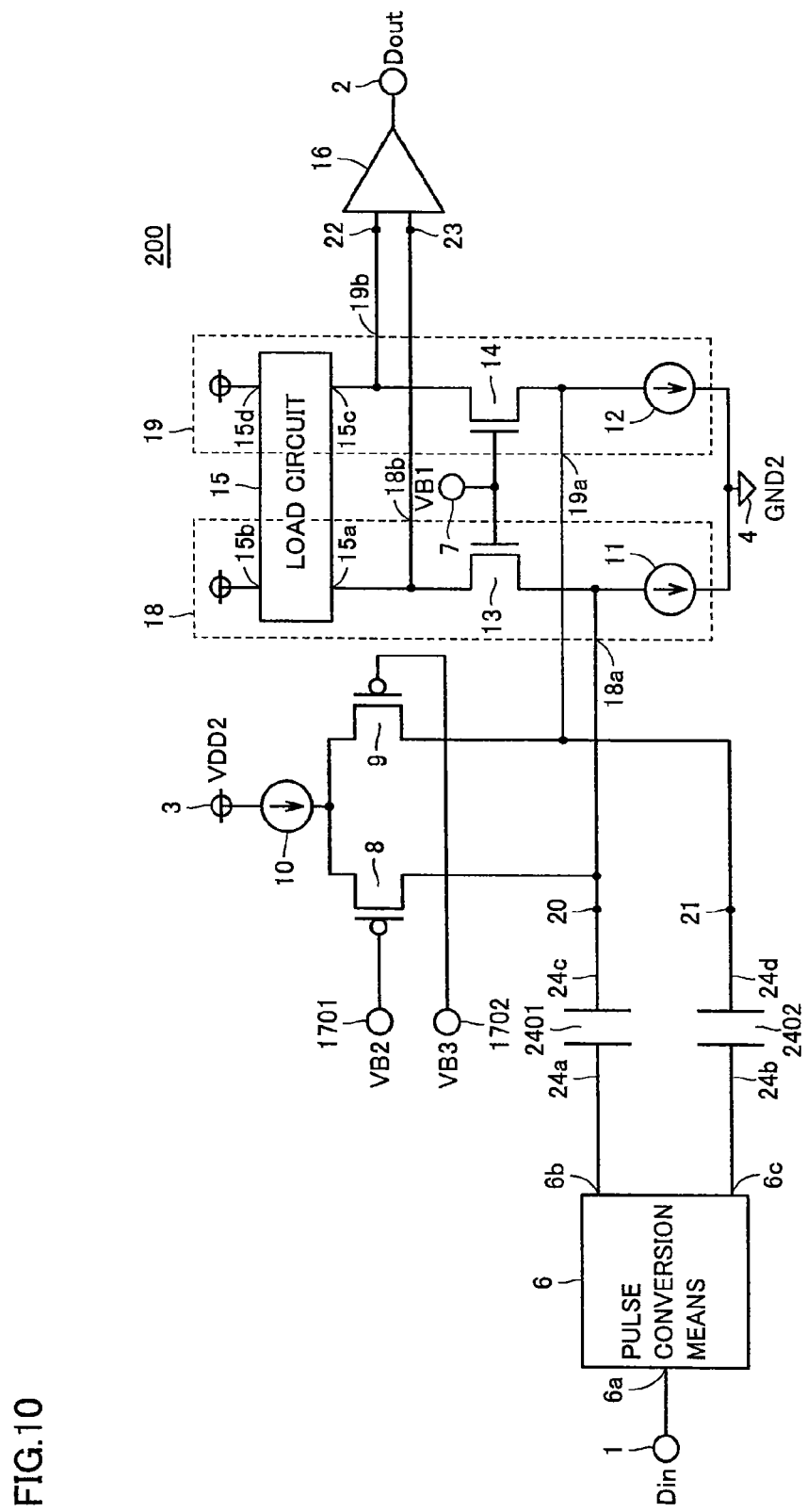
FIG. 10 is a circuit diagram showing a configuration of a signal transmission circuit 200 according to a second embodiment of the present invention.

FIG. 10 is a circuit diagram showing a configuration of a signal transmission circuit 200 according to a second embodiment of the present invention. Referring to FIG. 10, signal transmission circuit 200 in the second embodiment is a circuit demodulating input signal Din as output signal Dout at output terminal 2 while input terminal 1 and output terminal 2 are electrically isolated from each other by a capacitance 2401 and a capacitance 2402.

Signal transmission circuit 200 will be described as compared with signal transmission circuit 100 in FIG. 1. Signal transmission circuit 200 includes capacitance 2401 and capacitance 2402 instead of thin-film transformer 5 in signal transmission circuit 100. In signal transmission circuit 200 in the present second embodiment, by employing capacitance 2401 and capacitance 2402, in addition to the effect in the first embodiment, cost reduction owing to decrease in circuit area or decrease in the number of manufacturing process steps can be achieved.

Signal transmission circuit 200 includes input terminal 1, output terminal 2, pulse conversion means 6, capacitance 2401, capacitance 2402, bias terminal 1701, bias terminal 1702, PMOS transistor 8, PMOS transistor 9, constant current source 10, grounded-gate circuit 18, grounded-gate circuit 19, and comparator 16. In the present second embodiment, input terminal 1, output terminal 2, pulse conversion means 6, bias terminal 1701, bias terminal 1702, PMOS transistor 8, PMOS transistor 9, constant current source 10, grounded-gate circuit 18, grounded-gate circuit 19, and comparator 16 may be the same components as the corresponding components in signal transmission circuit 100 according to the first embodiment.

Capacitance 2401 has a terminal 24a connected to output terminal 6b of pulse conversion means 6 and a terminal 24c connected to input terminal 18a of grounded-gate circuit 18.

Capacitance 2402 has a terminal 24b connected to output terminal 6c of pulse conversion means 6 and a terminal 24d connected to input terminal 19a of grounded-gate circuit 19.

It is noted that the configuration of signal transmission circuit 200 is otherwise the same as the configuration of signal transmission circuit 100 and therefore description will not be repeated here.

Figure 11:
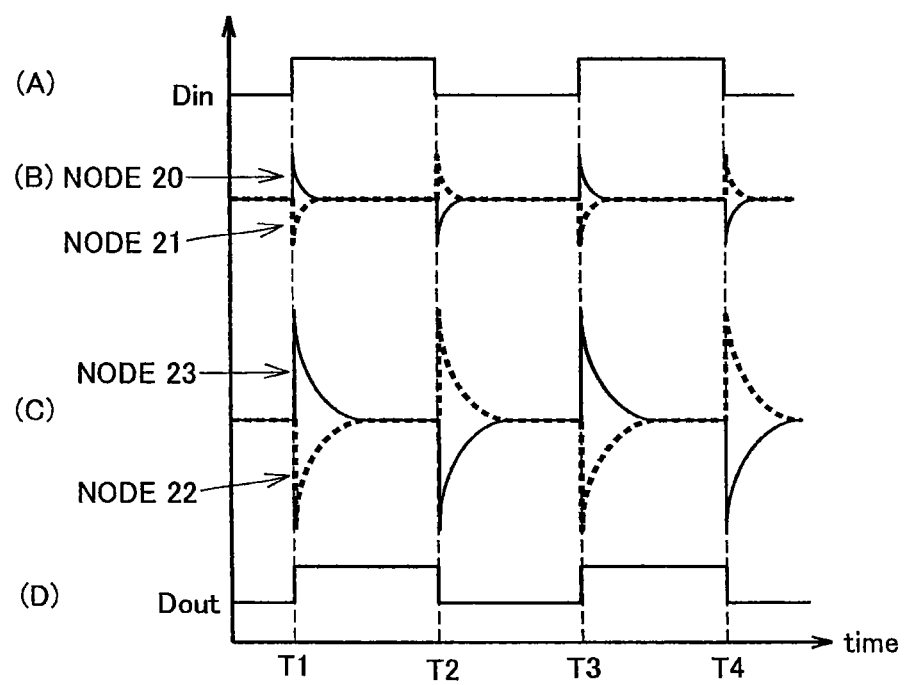
FIG. 11 is a diagram showing change over time of each voltage resulting from an operation of signal transmission circuit 200 in a case that configuration example D shown in FIG. 5 is employed for pulse conversion means 6.

FIG. 11 is a diagram showing change over time of each voltage resulting from an operation of signal transmission circuit 200 in a case that configuration example D shown in FIG. 5 is employed for pulse conversion means 6. An operation of signal transmission circuit 200 will be described with reference to FIG. 11.

FIG. 11 (A) shows a waveform of input signal Din which is a digital signal. FIG. 11 (B) shows voltage waveforms at node 20 and node 21. FIG. 11 (C) shows voltage waveforms at node 22 and node 23. FIG. 11 (D) shows a waveform of output signal Dout.

As shown in FIG. 11 (A), at time T1, the logic level of this input signal Din rises from low to high as time lapses, and at time T2, it falls from high to low. Then, again, the same signal change is repeated every (time T3–time T1) cycle.

When input signal Din rises from low to high (at time T1), as shown in FIG. 11 (B), slight signal change occurs at node 20 of terminal 24c of capacitance 2401. Here, at node 21 of terminal 24d of capacitance 2402, a differential signal resulting from reversal of polarity of the signal generated at node 20 is generated. Namely, during time period T1–T2, output signals which flow through nodes 20, 21 are signals complementary to each other.

In addition, when input signal Din falls from high to low (at time T2), at node 20 of terminal 24c of capacitance 2401, a signal reverse in phase to weak signal change at node 20 which occurred at the time of previous rise of input signal Din from low to high is generated. Namely, when time period T1–T2 and time period T2–T3 are compared with each other, an output signal which flows through node 20 is reverse in phase.

At node 21 of terminal 24d of capacitance 2402, as in the previous case, a differential signal resulting from reversal of polarity of the signal generated at node 20 is generated. Namely, during time period T2–T3, output signals which flow through nodes 20, 21 are signals complementary to each other.

A signal generated at terminal 24c (node 20) of capacitance 2401 is input to input terminal 18a of grounded-gate circuit 18, and the amplified signal is output from output terminal 18b thereof. A signal generated at terminal 24d (node 21) of capacitance 2402 is input to input terminal 19a of grounded-gate circuit 19, and the amplified signal is output from output terminal 19b thereof.

As shown in FIG. 11 (C), the signal at output terminal 18b of grounded-gate circuit 18 and the signal at output terminal 19b of grounded-gate circuit 19 which are differentially amplified are input to respective input terminals of comparator 16 at time T1 and they determine the logic level as output from comparator 16.

As shown in FIG. 11 (D), the output signal from comparator 16 is output signal Dout of output terminal 2 of signal transmission circuit 200 at time T1, and it is output by demodulating input signal Din which is a digital signal.

With such a configuration, signal transmission circuit 200 achieves an effect equivalent to that of signal transmission circuit 100, and in addition, as compared with signal transmission circuit 100, by replacing thin-film transformer 5 with capacitance 2401 and capacitance 2402, cost reduction owing to decrease in circuit area or decrease in the number of manufacturing process steps can be achieved.

Third Embodiment

Figure 12:
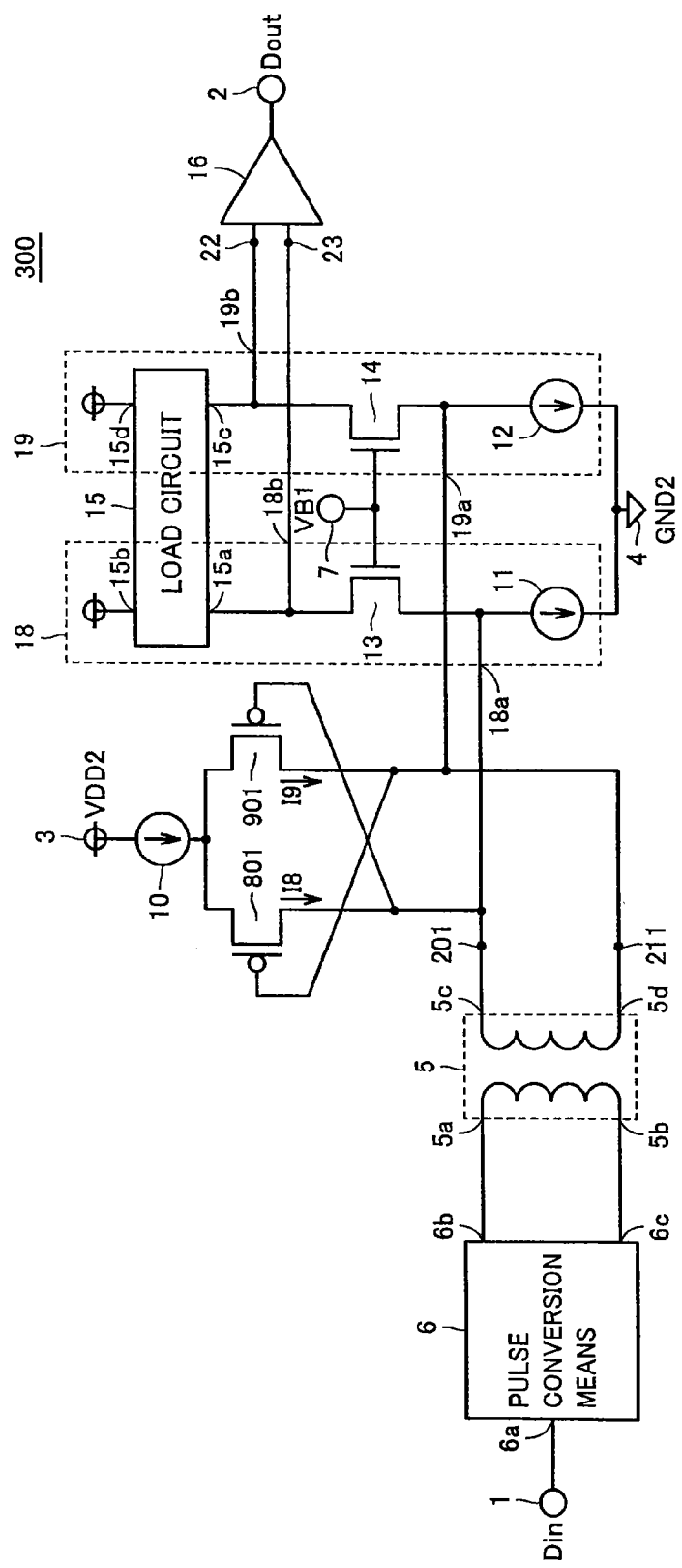
FIG. 12 is a circuit diagram showing a configuration of a signal transmission circuit 300 according to a third embodiment of the present invention.

FIG. 12 is a circuit diagram showing a configuration of a signal transmission circuit 300 according to a third embodiment of the present invention. Referring to FIG. 12, signal transmission circuit 300 in the third embodiment is a circuit receiving input signal Din at input terminal 1 and demodulating input signal Din as output signal Dout from output terminal 2 while input terminal 1 and output terminal 2 are electrically isolated from each other by thin-film transformer 5.

Signal transmission circuit 300 will be described as compared with signal transmission circuit 100 in FIG. 1. In signal transmission circuit 300, bias terminal 1701 in signal transmission circuit 100 is connected to the drain terminal of PMOS transistor 9 and bias terminal 1702 is connected to the drain terminal of PMOS transistor 8. In signal transmission circuit 300 in the present third embodiment, by applying a bias voltage to respective gate terminals of a PMOS transistor 801 and a PMOS transistor 901 from respective drain terminals of PMOS transistor 901 and PMOS transistor 801, the number of bias terminals can be reduced and output amplitude of thin-film transformer 5 can further be increased.

Signal transmission circuit 300 includes input terminal 1, output terminal 2, pulse conversion means 6, thin-film transformer 5, PMOS transistor 801, PMOS transistor 901, constant current source 10, grounded-gate circuit 18, grounded-gate circuit 19, and comparator 16. In the present third embodiment, input terminal 1, output terminal 2, pulse conversion means 6, thin-film transformer 5, constant current source 10, grounded-gate circuit 18, grounded-gate circuit 19, and comparator 16 may be the same components as the corresponding components in signal transmission circuit 100 according to the first embodiment.

PMOS transistor 801 has the gate terminal connected to the drain terminal of PMOS transistor 901, a source terminal connected to one end of constant current source 10, and the drain terminal connected to output terminal 5c of thin-film transformer 5 and input terminal 18a of grounded-gate circuit 18.

PMOS transistor 901 has the gate terminal connected to the drain terminal of PMOS transistor 801, a source terminal connected to one end of constant current source 10, and the drain terminal connected to output terminal 5d of thin-film transformer 5 and input terminal 19a of grounded-gate circuit 19.

It is noted that the configuration of signal transmission circuit 300 is otherwise the same as the configuration of signal transmission circuit 100 and therefore description will not be repeated here.

Figure 13:
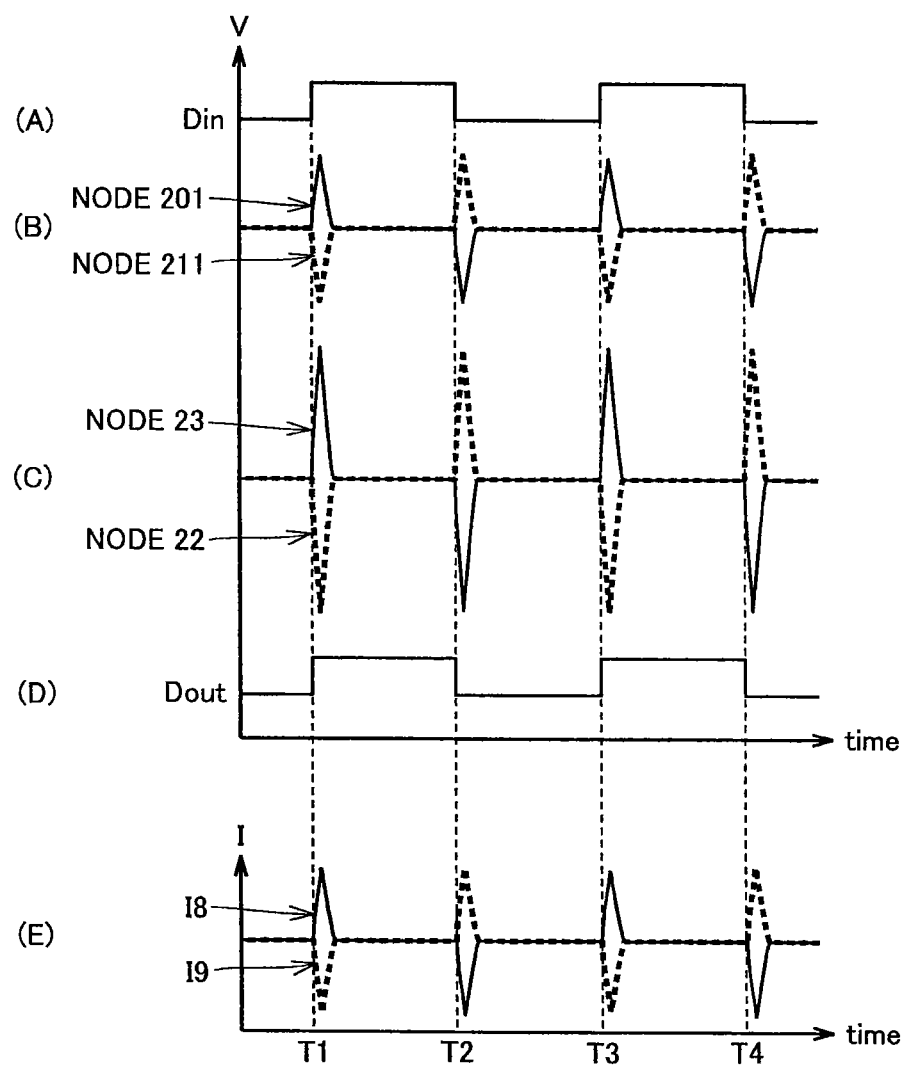
FIG. 13 is a diagram showing change over time of each voltage resulting from an operation of signal transmission circuit 300 in a case that configuration example D shown in FIG. 5 is employed for pulse conversion means 6.

FIG. 13 is a diagram showing change over time of each voltage resulting from an operation of signal transmission circuit 300 in a case that configuration example D shown in FIG. 5 is employed for pulse conversion means 6. An operation of signal transmission circuit 300 will be described with reference to FIG. 13.

FIG. 13 (A) shows a waveform of input signal Din which is a digital signal. FIG. 13 (B) shows voltage waveforms at a node 201 and a node 211. FIG. 13 (C) shows voltage waveforms at node 22 and node 23. FIG. 13 (D) shows a waveform of output signal Dout.

As shown in FIG. 13 (A), at time T1, the logic level of this input signal Din rises from low to high, and at time T2, it falls from high to low. Then, again, the same signal change is repeated every (time T3–time T1) cycle.

When input signal Din rises from low to high (at time T1), as shown in FIG. 13 (B), slight signal change occurs at node 201 connected to output terminal 5c of thin-film transformer 5. Here, at node 211 connected to output terminal 5d of thin-film transformer 5, a differential signal resulting from reversal of polarity of the signal generated at node 201 is generated. Namely, during time period T1-T2, output signals which flow through nodes 201, 211 are signals complementary to each other.

In addition, when input signal Din rises from low to high (at time T1), as shown in FIG. 13 (E), a current I8 which flows through the drain terminal of PMOS transistor 801 increases with change in signal at node 211, and a current I9 which flows through the drain terminal of PMOS transistor 901 decreases with change in signal at node 201. Namely, during time period T1-T2, owing to change in complementary output signals which flow through nodes 201, 211, current I8 which flows through the drain terminal of PMOS transistor 801 and current I9 which flows through the drain terminal of PMOS transistor 901 exhibit change complementary to each other, and as compared with signal transmission circuit 100, a potential difference between the output signals which flow through nodes 201, 211 is greater.

When input signal Din falls from high to low (at time T2), at node 201 connected to output terminal 5c of thin-film transformer 5, a signal reverse in phase to weak signal change at node 201 which occurred at the time of previous rise of input signal Din from low to high is generated. Namely, when time period T1-T2 and time period T2-T3 are compared with each other, an output signal which flows through node 201 is reverse in phase.

At node 211 connected to output terminal 5d of thin-film transformer 5, as in the previous case, a differential signal resulting from reversal of polarity of the signal generated at node 201 is generated. Namely, during time period T2-T3, output signals which flow through nodes 201, 211 are signals complementary to each other.

In addition, when input signal Din rises from high to low (at time T2), as shown in FIG. 13 (E), current I8 which flows through the drain terminal of PMOS transistor 801 decreases with change in signal at node 211, and current I9 which flows through the drain terminal of PMOS transistor 901 increases with change in signal at node 201. Namely, during time period T2-T3, owing to change in complementary output signals which flow through nodes 201, 211, current I8 which flows through the drain terminal of PMOS transistor 801 and current I9 which flows through the drain terminal of PMOS transistor 901 exhibit change complementary and reverse in phase to that during time period T1-T2, and as compared with signal transmission circuit 100, a potential difference between the output signals which flow through nodes 201, 211 is greater.

A signal generated at output terminal 5c (node 201) of thin-film transformer 5 is input to input terminal 18a of grounded-gate circuit 18, and the amplified signal is output from output terminal 18b thereof.

A signal generated at output terminal 5d (node 211) of thin-film transformer 5 is input to input terminal 19a of grounded-gate circuit 19, and the amplified signal is output from output terminal 19b thereof.

As shown in FIG. 13 (C), the signal at output terminal 18b of grounded-gate circuit 18 and the signal at output terminal 19b of grounded-gate circuit 19 which are differentially amplified are input to respective input terminals of comparator 16 at time T1 and they determine the logic level as output from comparator 16.

As shown in FIG. 13 (D), the output signal from comparator 16 is output signal Dout of output terminal 2 of signal transmission circuit 300 at time T1, and it is output by demodulating input signal Din which is a digital signal.

A DC voltage of a signal at output terminal 5c (node 201) of thin-film transformer 5 is uniquely determined by a cascode circuit constituted of constant current source 11 and NMOS transistor 13 of grounded-gate circuit 18.

A DC voltage of a signal at output terminal 5d (node 211) of thin-film transformer 5 is uniquely determined by a cascode circuit constituted of constant current source 12 and NMOS transistor 14 of grounded-gate circuit 19.

Thus, by connecting the gate terminal of PMOS transistor 801 to the drain terminal of PMOS transistor 901 and connecting the gate terminal of PMOS transistor 901 to the drain terminal of PMOS transistor 801, current I8 which flows through the drain terminal of PMOS transistor 801 and current I9 which flows through the drain terminal of PMOS transistor 901 are increased and decreased complementarily with complementary signal change at nodes 201 and 211, so that a potential difference at the time of signal change at nodes 201 and 211 can further be greater and in addition bias terminals 1701 and 1702 in signal transmission circuit 100 can be eliminated.

Fourth Embodiment

Figure 14:
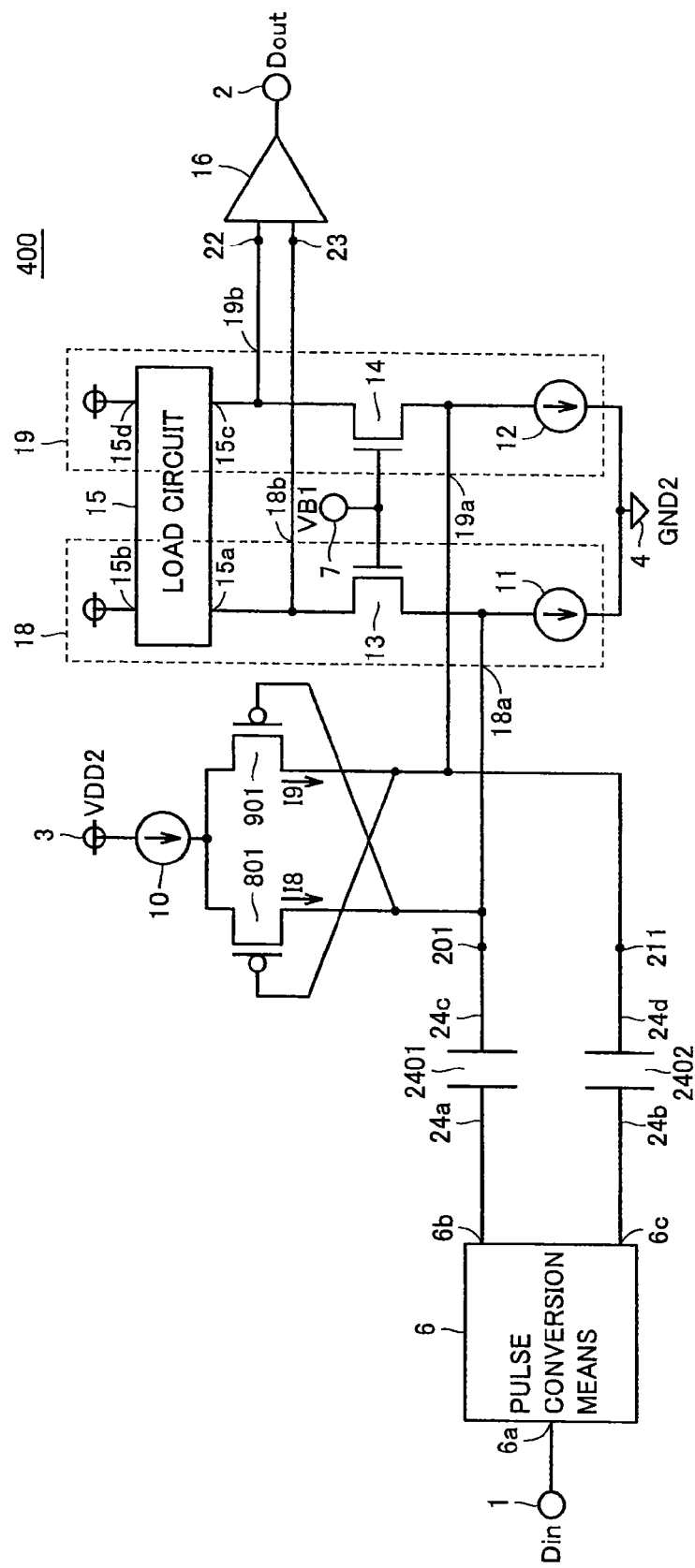
FIG. 14 is a circuit diagram showing a configuration of a signal transmission circuit 400 according to a fourth embodiment of the present invention.

FIG. 14 is a circuit diagram showing a configuration of a signal transmission circuit 400 according to a fourth embodiment of the present invention. Referring to FIG. 14, signal transmission circuit 400 in the fourth embodiment is a circuit receiving input signal Din at input terminal 1 and demodulating the input signal as output signal Dout from output terminal 2 while input terminal 1 and output terminal 2 are electrically isolated from each other by capacitance 2401 and capacitance 2402.

Signal transmission circuit 400 will be described as compared with signal transmission circuit 300 in FIG. 12. Signal transmission circuit 400 includes capacitance 2401 and capacitance 2402 instead of thin-film transformer 5 in signal transmission circuit 300. In signal transmission circuit 400 in the present fourth embodiment, by employing capacitance 2401 and capacitance 2402, in addition to the effect in the third embodiment, cost reduction owing to decrease in circuit area or decrease in the number of manufacturing process steps can be achieved.

Signal transmission circuit 400 includes input terminal 1, output terminal 2, pulse conversion means 6, capacitance 2401, capacitance 2402, PMOS transistor 801, PMOS transistor 901, constant current source 10, grounded-gate circuit 18, grounded-gate circuit 19, and comparator 16. In the present fourth embodiment, input terminal 1, output terminal 2, pulse conversion means 6, PMOS transistor 801, PMOS transistor 901, constant current source 10, grounded-gate circuit 18, grounded-gate circuit 19, and comparator 16 may be the same components as the corresponding components in signal transmission circuit 300 according to the third embodiment.

Capacitance 2401 has terminal 24a connected to output terminal 6b of pulse conversion means 6 and terminal 24c connected to input terminal 18a of grounded-gate circuit 18.

Capacitance 2402 has terminal 24b connected to output terminal 6c of pulse conversion means 6 and terminal 24d connected to input terminal 19a of grounded-gate circuit 19.

It is noted that the configuration of signal transmission circuit 400 is otherwise the same as the configuration of signal transmission circuit 300 and therefore description will not be repeated here.

FIG. 15 is a diagram showing change over time of each voltage resulting from an operation of signal transmission circuit 400 in a case that configuration example D shown in FIG. 5 is employed for pulse conversion means 6. An operation of signal transmission circuit 400 will be described with reference to FIG. 15.

FIG. 15 (A) shows a waveform of input signal Din which is a digital signal. FIG. 15 (B) shows voltage waveforms at node 201 and node 211. FIG. 15 (C) shows voltage waveforms at node 22 and node 23. FIG. 15 (D) shows a waveform of output signal Dout.

As shown in FIG. 15 (A), at time T1, the logic level of this input signal Din rises from low to high, and at time T2, it falls from high to low. Then, again, the same signal change is repeated every (time T3−time T1) cycle.

When input signal Din rises from low to high (at time T1), as shown in FIG. 15 (B), slight signal change occurs at node 201 of terminal 24c of capacitance 2401. Here, at node 211 of terminal 24d of capacitance 2402, a differential signal resulting from reversal of polarity of the signal generated at node 201 is generated. Namely, during time period T1–T2, output signals which flow through nodes 201, 211 are signals complementary to each other.

In addition, when input signal Din rises from low to high (at time T1), as shown in FIG. 15 (E), current I8 which flows through the drain terminal of PMOS transistor 801 increases with change in signal at node 211, and current I9 which flows through the drain terminal of PMOS transistor 901 decreases with change in signal at node 201. Namely, during time period T1–T2, owing to change in complementary output signals which flow through nodes 201, 211, current I8 which flows through the drain terminal of PMOS transistor 801 and current I9 which flows through the drain terminal of PMOS transistor 901 exhibit change complementary to each other, and a potential difference between the output signals which flow through nodes 201, 211 is greater.

In addition, when input signal Din falls from high to low (at time T2), at node 201 of terminal 24c of capacitance 2401, a signal reverse in phase to weak signal change at node 201 which occurred at the time of previous rise of input signal Din from low to high is generated. Namely, when time period T1–T2 and time period T2–T3 are compared with each other, an output signal which flows through node 201 is reverse in phase.

At node 211 of terminal 24d of capacitance 2402, as in the previous case, a differential signal resulting from reversal of polarity of the signal generated at node 201 is generated. Namely, during time period T2–T3, output signals which flow through nodes 201, 211 are signals complementary to each other.

In addition, when input signal Din falls from high to low (at time T2), as shown in FIG. 15 (E), current I8 which flows through the drain terminal of PMOS transistor 801 decreases with change in signal at node 211, and current I9 which flows through the drain terminal of PMOS transistor 901 increases with change in signal at node 201. Namely, during time period T2–T3, owing to change in complementary output signals which flow through nodes 201, 211, current I8 which flows through the drain terminal of PMOS transistor 801 and current I9 which flows through the drain terminal of PMOS transistor 901 exhibit change complementary and reverse in phase to that during time period T1–T2, and a potential difference between the output signals which flow through nodes 201, 211 is greater.

A signal generated at terminal 24c (node 201) of capacitance 2401 is input to input terminal 18a of grounded-gate circuit 18, and the amplified signal is output from output terminal 18b thereof. A signal generated at terminal 24d (node 211) of capacitance 2402 is input to input terminal 19a of grounded-gate circuit 19, and the amplified signal is output from output terminal 19b thereof.

As shown in FIG. 15 (C), the signal at output terminal 18b of grounded-gate circuit 18 and the signal at output terminal 19b of grounded-gate circuit 19 which are differentially amplified are input to respective input terminals of comparator 16 at time T1 and they determine the logic level as output from comparator 16.

As shown in FIG. 15 (D), the output signal from comparator 16 is output signal Dout of output terminal 2 of signal transmission circuit 400 at time T1, and it is output by demodulating input signal Din which is a digital signal.

With such a configuration, signal transmission circuit 400 achieves an effect equivalent to that of signal transmission circuit 300, and in addition, as compared with signal transmission circuit 300, by replacing thin-film transformer 5 with capacitance 2401 and capacitance 2402, cost reduction owing to decrease in circuit area or decrease in the number of manufacturing process steps can be achieved.

Finally, referring again to FIG. 1 and the like, the present embodiment will be summarized.

According to the present first and second embodiments, as shown in FIG. 1 and the like, signal transmission circuit 100, 200 transmitting a signal through an isolation element includes pulse conversion means 6 receiving an input signal and converting the input signal to a pulse signal, an isolation circuit (such as a thin-film transformer or capacitances 2401, 2402) including the isolation element, receiving output from pulse conversion means 6, and outputting corresponding complementary first and second output signals, grounded-gate circuit 18 amplifying the first output signal, grounded-gate circuit 19 amplifying the second output signal, PMOS transistor 8 having the drain terminal connected to the node receiving the first output signal of grounded-gate circuit 18, for adjusting the first output signal, PMOS transistor 9 having the drain terminal connected to the node receiving the second output signal of grounded-gate circuit 19, for adjusting the second output signal, constant current source 10 having one end connected to the power supply node and the other end connected to the source terminal of PMOS transistor 8 and the source terminal of PMOS transistor 9, and comparator 16 comparing output from grounded-gate circuit 18 and output from grounded-gate circuit 19 with each other.

Preferably, the isolation element includes thin-film transformer 5 or capacitances 2401, 2402.

According to the configuration of signal transmission circuit 100 in the first embodiment, by applying a DC voltage to each output terminal of thin-film transformer 5 with the use of grounded-gate circuit 18 and grounded-gate circuit 19 without using a resistor, lowering in signal amplitude or lowering in resistance to noise due to thermal noise of the resistor can be suppressed as compared with a case that a resistor is employed. In addition, in order to suppress lowering in signal amplitude due to resistance, it is necessary either to increase an amount of current of pulse conversion means 6 or to increase the number of windings in thin-film transformer 5. In signal transmission circuit 100 in the present first embodiment, a DC voltage can be applied to each output terminal of thin-film transformer 5 without increase in circuit area based on increase in the number of windings in thin-film transformer 5.

In addition, according to the configuration of signal transmission circuit 200 in the second embodiment, an effect equivalent to that of signal transmission circuit 100 in the first embodiment can be obtained. Moreover, cost reduction owing to decrease in circuit area or simplification of a manufacturing process can be achieved.

Further preferably, voltages of the first and second output signals can be adjusted based on a potential difference between a gate voltage of PMOS transistor 8 and a gate voltage of PMOS transistor 9.

Preferably, gain of grounded-gate circuit 18, 19 is lowered by increasing each gate voltage of PMOS transistor 8, 9, without change in potential difference between a gate voltage of PMOS transistor 8 and a gate voltage of PMOS transistor 9.

Alternatively, preferably, gain of grounded-gate circuit 18, 19 is increased by lowering each gate voltage of PMOS transistor 8, 9, without change in potential difference between a gate voltage of PMOS transistor 8 and a gate voltage of PMOS transistor 9.

Preferably, output DC voltages of grounded-gate circuits 18, 19 are lowered by increasing each gate voltage of PMOS transistor 8, 9, without change in potential difference between a gate voltage of PMOS transistor 8 and a gate voltage of PMOS transistor 9.

Alternatively, preferably, output DC voltages of grounded-gate circuits 18, 19 are raised by lowering each gate voltage of PMOS transistor 8, 9, without change in potential difference between a gate voltage of PMOS transistor 8 and a gate voltage of PMOS transistor 9.

According to the present third and fourth embodiments, as shown in FIG. 12 and the like, signal transmission circuit 300, 400 transmitting a signal through an isolation element includes pulse conversion means 6 receiving an input signal and converting the input signal to a pulse signal, an isolation circuit (such as thin-film transformer 5 or capacitances 2401, 2402) including the isolation element, receiving output from pulse conversion means 6, and outputting corresponding complementary first and second output signals, grounded-gate circuit 18 amplifying the first output signal, grounded-gate circuit 19 amplifying the second output signal, PMOS transistor 801 having the drain terminal receiving the first output signal from the isolation circuit and the gate terminal receiving the second output signal from the isolation circuit, for increasing a potential difference between the complementary first and second output signals, PMOS transistor 901 having the drain terminal receiving the second output signal from the isolation circuit and the gate terminal receiving the first output signal from the isolation circuit, for increasing a potential difference between the complementary first and second output signals, constant current source 10 having one end connected to the power supply node and the other end connected to the source terminal of PMOS transistor 801 and the source terminal of PMOS transistor 901, and comparator 16 comparing output from grounded-gate circuit 18 and output from grounded-gate circuit 19 with each other.

Preferably, the isolation element includes thin-film transformer 5 or capacitances 2401, 2402.

According to the configuration of signal transmission circuit 300 in the third embodiment, as compared with signal transmission circuit in the first embodiment, a potential difference between the complementary first and second output signals can be increased, and in addition, a circuit area can be decreased by eliminating bias terminals 1701, 1702.

In addition, according to the configuration of signal transmission circuit 400 in the fourth embodiment, an effect equivalent to that of signal transmission circuit 300 in the third embodiment can be obtained. Moreover, cost reduction owing to decrease in circuit area or simplification of a manufacturing process can be achieved.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

3 voltage source; 5 thin-film transformer; 6 pulse conversion means; 7 bias terminal; 8, 9, 13, 14, 1503, 1504, 801, 901 MOS transistor; 10, 11, 12, 1505, 1506 constant current source; 15 load circuit; 16 comparator; 18, 19 grounded-gate circuit; 100, 200, 300, 400 signal transmission circuit; 601, 603, 604, 609 buffer circuit; 605 delay circuit; 606, 607 rising edge detection circuit; 608, 610 inverter; 1501, 1502 resistor; 2401, 2402 capacitance; and VB1, VB2, VB3 voltage.

The invention claimed is:

1. A signal transmission circuit, comprising:
   a pulse converter that receives an input signal and converts said input signal to a pulse signal;
   an isolation circuit including a transformer, that receives an output from said pulse converter, and outputs corresponding complementary first and second output signals;
   a first grounded-gate circuit that amplifies said first output signal;
   a second grounded-gate circuit that amplifies said second output signal;
   a first MOS (Metal Oxide Semiconductor) transistor having a drain terminal directly connected to a node of said first grounded-gate circuit that receives said first output signal, for adjusting said first output signal;
   a second MOS transistor having a drain terminal directly connected to a node of said second grounded-gate circuit that receives said second output signal, for adjusting said second output signal;
   a constant current source having one end connected to a power supply node and the other end connected to a source terminal of said first MOS transistor and a source terminal of said second MOS transistor; and
   a comparator that compares an output from said first grounded-gate circuit and an output from said second grounded-gate circuit with each other, and generates an output signal.

2. The signal transmission circuit according to claim 1, wherein
   said transformer is a thin-film transformer.

3. The signal transmission circuit according to claim 1, wherein
   voltages of said first and second output signals can be adjusted based on a potential difference between a first gate voltage of said first MOS transistor and a second gate voltage of said second MOS transistor.

4. The signal transmission circuit according to claim 1, wherein
   gain of said first and second grounded-gate circuits is lowered by raising said first and second gate voltages, without change in potential difference between a first gate voltage of said first MOS transistor and a second gate voltage of said second MOS transistor.

5. The signal transmission circuit according to claim 1, wherein
   gain of said first and second grounded-gate circuits is increased by lowering said first and second gate voltages, without change in potential difference between a first gate voltage of said first MOS transistor and a second gate voltage of said second MOS transistor.

6. The signal transmission circuit according to claim 1, wherein
output DC voltages of said first and second grounded-gate circuits are lowered by raising said first and second gate voltages, without change in potential difference between a first gate voltage of said first MOS transistor and a second gate voltage of said second MOS transistor.

7. The signal transmission circuit according to claim 1, wherein
output DC voltages of said first and second grounded-gate circuits are raised by lowering said first and second gate voltages, without change in potential difference between a first gate voltage of said first MOS transistor and a second gate voltage of said second MOS transistor.

\* \* \* \* \*